United States Patent
McGinnis et al.

(10) Patent No.: US 9,156,729 B2
(45) Date of Patent: Oct. 13, 2015

(54) HIGH REFRACTIVE INDEX GLASS COMPOSITION

(75) Inventors: Peter B. McGinnis, Gahanna, OH (US); Douglas Hofmann, Hebron, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 262 days.

(21) Appl. No.: 13/879,627

(22) PCT Filed: Oct. 18, 2011

(86) PCT No.: PCT/US2011/056641
§ 371 (c)(1),
(2), (4) Date: Apr. 16, 2013

(87) PCT Pub. No.: WO2012/054432
PCT Pub. Date: Apr. 26, 2012

(65) Prior Publication Data
US 2013/0217807 A1    Aug. 22, 2013

Related U.S. Application Data

(60) Provisional application No. 61/394,166, filed on Oct. 18, 2010.

(51) Int. Cl.
C03C 13/00    (2006.01)
C03C 3/062    (2006.01)
C03C 3/068    (2006.01)

(52) U.S. Cl.
CPC ............ *C03C 13/00* (2013.01); *C03C 3/062* (2013.01); *C03C 3/068* (2013.01)

(58) Field of Classification Search
CPC .......... C03C 13/00; C03C 3/062; C03C 3/068
USPC ......... 524/494, 556, 579, 584, 599, 605, 606, 524/609, 611; 65/475; 501/35, 38; 523/458
See application file for complete search history.

(56) References Cited

U.S. PATENT DOCUMENTS

| | | | |
|---|---|---|---|
| 3,573,078 A * | 3/1971 | Bacon .............................. | 501/38 |
| 3,804,646 A | 4/1974 | Dumbaugh, Jr. | |
| 3,958,999 A | 5/1976 | Izumitani et al. | |
| 4,055,435 A | 10/1977 | Sagara | |
| 4,057,435 A | 11/1977 | Boudot et al. | |
| 4,080,216 A | 3/1978 | Ishibashi et al. | |
| 4,404,290 A | 9/1983 | Boudot | |
| 4,732,875 A | 3/1988 | Sagara | |
| 4,839,314 A | 6/1989 | Boudot et al. | |
| 6,121,176 A | 9/2000 | Comte | |
| 6,753,278 B2 | 6/2004 | Wolff et al. | |
| 6,806,217 B2 | 10/2004 | Furukawa et al. | |
| 6,977,232 B2 | 12/2005 | Hayashi et al. | |
| 7,015,164 B2 | 3/2006 | Kasuga et al. | |
| 7,033,966 B2 | 4/2006 | Kobayashi et al. | |
| 7,088,903 B2 | 8/2006 | Ishioka | |
| 7,091,145 B2 | 8/2006 | Wolff et al. | |
| 7,098,158 B2 | 8/2006 | Natsugari et al. | |
| 7,140,205 B2 | 11/2006 | Fujiwara et al. | |
| 7,141,525 B2 | 11/2006 | Yamamoto et al. | |
| 7,297,647 B2 | 11/2007 | Wolff et al. | |
| 7,309,670 B2 | 12/2007 | Fujiwara et al. | |
| 7,312,169 B2 | 12/2007 | Yamamoto et al. | |
| 7,320,949 B2 | 1/2008 | Uehara | |
| 7,335,614 B2 | 2/2008 | Uehara et al. | |
| 7,368,404 B2 | 5/2008 | Uehara | |
| 7,396,786 B2 | 7/2008 | Miyata et al. | |
| 7,451,620 B2 | 11/2008 | Zou et al. | |
| 7,468,338 B2 | 12/2008 | Hayashi et al. | |
| 7,482,293 B2 | 1/2009 | Tsai et al. | |
| 7,490,485 B2 | 2/2009 | Endo | |
| 7,491,667 B2 | 2/2009 | Hayashi | |
| 7,605,099 B2 | 10/2009 | Wolff et al. | |
| 7,638,448 B2 | 12/2009 | Wolff et al. | |
| 7,638,450 B2 | 12/2009 | Ritter et al. | |
| 2002/0073735 A1 | 6/2002 | Hayashi et al. | |
| 2003/0040422 A1 | 2/2003 | Kikuchi et al. | |
| 2003/0073735 A1 | 4/2003 | Lee et al. | |
| 2003/0211929 A1 | 11/2003 | Hayashi et al. | |
| 2004/0186003 A1 | 9/2004 | Uehara | |
| 2008/0063875 A1 * | 3/2008 | Robinson et al. ............. | 428/426 |

(Continued)

FOREIGN PATENT DOCUMENTS

| | | |
|---|---|---|
| EP | 1757422 | 9/2012 |
| GB | 2233643 | 1/1991 |
| WO | 2012/054432 | 4/2012 |

OTHER PUBLICATIONS

Office action from Chinese Application No. 201180056849.5 dated Dec. 31, 2014.
International Search Report and Written Opinion from PCT/US11/56641 dated May 4, 2012.

Primary Examiner — Ling Choi
Assistant Examiner — Chun-Cheng Wang
(74) Attorney, Agent, or Firm — Calfee, Halter & Griswold LLP

(57) ABSTRACT

A glass composition including $SiO_2$ in an amount from 30.0 to 40.0% by weight, $Al_2O_3$ in an amount from 15.0 to 23.0% by weight, $B_2O_3$ in an amount from 0.0 to 15.0% by weight, $K_2O$ in an amount from 0.0 to 5.0% by weight, $La_2O_3$ in an amount from 0.0 to 30.0% by weight, $Li_2O$ in an amount from 0.0 to 3.0% by weight, $Na_2O$ in an amount from 0.0 to 4.0% by weight, $Nb_2O_5$ in an amount from 0.0 to 10.0% by weight, $TiO_2$ in an amount from 0.0 to 7.5% by weight, $WO_3$ in an amount from 0.0 to 10.0% by weight, $Y_2O_3$ in an amount from 15.0 to 35.0% by weight, and RO (one or more of MgO, CaO, SrO, and BaO) in an amount from 0.0 to 7.5% by weight is provided. Glass fibers formed from the composition have a refractive index between 1.55 and 1.69.

21 Claims, No Drawings

(56) References Cited

U.S. PATENT DOCUMENTS

| | | |
|---|---|---|
| 7,501,366 B2 | 3/2009 | Wolff et al. |
| 7,501,369 B2 | 3/2009 | Tachiwana |
| 7,514,381 B2 | 4/2009 | Matsumoto et al. |
| 7,524,781 B2 | 4/2009 | Nagashima et al. |
| 7,528,083 B2 | 5/2009 | Shimizu et al. |
| 7,531,474 B2 | 5/2009 | Shiraishi |
| 7,563,738 B2 | 7/2009 | Uehara |
| 7,572,747 B2 | 8/2009 | Clare et al. |
| 7,598,192 B2 | 10/2009 | Wolff et al. |

* cited by examiner

HIGH REFRACTIVE INDEX GLASS COMPOSITION

RELATED APPLICATIONS

This application is the U.S. national phase entry of PCT/US2011/056641 with an international filing date of Oct. 18, 2011 which claims the benefit of provisional U.S. patent application Ser. No. 61/394,166 filed on Oct. 18, 2010 for HIGH REFRACTIVE INDEX GLASS COMPOSITION, the entire disclosures of which are fully incorporated herein by reference in their entirety.

TECHNICAL FIELD

The present invention relates generally to a glass composition, and more particularly, to a glass composition for forming high refractive index glass fibers. The glass fibers may be used to reinforce plastics and form a composite having a high refractive index. These high refractive index composites may then be used in applications where high strength and transparency are required.

BACKGROUND

Glass fibers are manufactured from various raw materials combined in specific proportions to yield a desired chemical composition. This collection of materials is commonly termed a "glass batch." To form glass fibers, typically the glass batch is melted in a melter or melting apparatus, the molten glass is drawn into filaments through a bushing or orifice plate, and a sizing composition containing lubricants, coupling agents and film-forming binder resins is applied to the filaments. After the sizing is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers. The fibers, in turn, may be used to reinforce plastics and various other structural and non-structural products.

The composition of the glass batch and the glass manufactured from it are generally expressed in terms of percentages of the components and are mainly expressed as oxides. Compounds such as $SiO_2$, $Al_2O_3$, CaO, MgO, $B_2O_3$, $La_2O$, $Nb_2O_5$, $Ta_2O_5$, $ZrO_2$, $_2O_3$, $Li_2O$, $Na_2O$, $GdO_3$, BaO, SrO, ZnO, $ZrO_2$, $P_2O_5$, $GeO_2$, $WO_3$, $Fe_2O_3$, fluorine, and $SO_3$ may be used to form a glass batch. Numerous types of glasses may be produced from varying the amounts of these oxides, or eliminating some of the oxides in the glass batch. Normal reinforcement glasses such as R-glass, E-glass, S-glass, A-glass, C-glass, and ECR-glass may be formed from certain combinations of the oxides. In addition, optical glasses having a desired refractive index can be produced by choosing oxides for the glass batch. The glass composition controls the forming and product properties of the glass. Characteristics of glass compositions include the raw material cost and environmental impact.

High refractive index glasses and use thereof in optical lens applications are known in the art. However, conventional optical glass fibers are unable to be formed by conventional fiberizing techniques because they lack sufficient viscosity above their crystallization temperature to be formed into fibers. Thus, although high refractive index glasses exist, there remains a need in the art for glass compositions that possess a high refractive index, an Abbe number and a coefficient of thermal expansion that is appropriate for the reinforcement of high refractive index plastics, and a viscosity above the liquidus temperature that is sufficiently high to permit the formation of fibers using conventional fiber forming techniques.

SUMMARY OF THE INVENTION

The general inventive concepts include a composition that includes $SiO_2$ in an amount from 30.0 to 40.0% by weight, $Al_2O_3$ in an amount from 15.0 to 23.0% by weight, $B_2O_3$ in an amount from 0.0 to 15.0% by weight, $K_2O$ in an amount from 0.0 to 5.0% by weight, $La_2O_3$ in an amount from 0.0 to 30.0% by weight, $Li_2O$ in an amount from 0.0 to 3.0% by weight, $Na_2O$ in an amount from 0.0 to 4.0% by weight, $Nb_2O_5$ in an amount from 0.0 to 10.0% by weight, $TiO_2$ in an amount from 0.0 to 7.5% by weight, $WO_3$ in an amount from 0.0 to 10.0% by weight, $Y_2O_3$ in an amount from 15.0 to 35.0% by weight, and RO in an amount from 0.0 to 7.5% by weight, where RO is one or more of MgO, CaO, SrO, and BaO. The phrase "% by weight", as used herein, is intended to be defined as the percent by weight of the total composition.

In some exemplary embodiments, the composition also contains trace quantities of other components or impurities that are not intentionally added. Also, in some exemplary embodiments, the glass composition is free or substantially free of fluorine and lead.

In some exemplary embodiments, glass fibers formed from the composition have a refractive index between 1.55 and 1.69, an Abbe number less than about 65, and a coefficient of thermal expansion (CTE) less than about $66 \times 10^{-7}$ cm/cm. Further, the glass composition and fibers produced therefrom possess a CTE and an Abbe number that may be suitable for reinforcing high refractive index plastics.

In some exemplary embodiments, the glass composition possesses a viscosity above the liquidus temperature that is sufficiently high to permit the glass fibers to be formed using conventional fiber forming techniques, such as, for example, a platinum-lined melter.

In some exemplary embodiments, a reinforced composite is formed from a matrix material and a plurality of fibers formed from the composition described. The matrix material may be any suitable thermoplastic or thermoset resin known to those of skill in the art, and includes thermoplastics and thermoset resins such as polyesters, polypropylene, polyamide, polyethylene terephthalate, polybutylene, polysulfone, polyethersulfone, polyether imide, polyarylate, epoxy resins, unsaturated polyesters, phenolics, vinylesters, and elastomers. The polymer resins can be used alone or in combination to form the final composite product.

In some exemplary embodiments, glass fibers formed from the inventive compositions have a liquidus temperature no greater than about 1531° C., a log 3 temperature less than about 1443° C., and a ΔT up to about 77° C.

In yet other exemplary embodiments, glass fibers formed from the inventive composition have a refractive index between about 1.55 and about 1.69, preferably from about 1.55 to about 1.65.

In further exemplary embodiments, glass fibers formed from the inventive composition have an Abbe number less than about 65, preferably less than about 60, and a coefficient of thermal expansion less than about $66 \times 10^{-7}$ cm/cm, preferably less than about $55 \times 10^{-7}$ cm/cm.

In some exemplary embodiments, the difference between the forming temperature and the crystallization temperature is from about $-170°$ C. to about $77°$ C.

The foregoing and other objects, features, and advantages of the invention will appear more fully hereinafter from a consideration of the detailed description that follows.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references. The terms "composition" and "formulation" may be used interchangeably herein. Additionally, the phrase "inventive glass composition" and "glass composition" may be interchangeably used.

The general inventive concepts relate to a glass composition used to form continuous glass fibers that may be used to reinforce high refractive index polymer matrices and form transparent or translucent composite products. In addition, the glass composition has a viscosity that is sufficiently above the liquidus temperature to permit the glass fibers to be formed using currently available fiber forming techniques, such as, for example, a platinum-lined melter.

In some exemplary embodiments, the inventive glass composition includes the following components in the weight percent ranges given in Table 1. As used herein, the terms "weight percent" and "percent by weight" may be used interchangeably and are meant to denote the weight percent (or percent by weight) based on the total composition.

TABLE 1

| Chemical | % by weight |
|---|---|
| $SiO_2$ | 30.0-40.0 |
| $Al_2O_3$ | 15.0-23.0 |
| $B_2O_3$ | 0.0-15.0 |
| $K_2O$ | 0.0-5.0 |
| $La_2O_3$ | 0.0-30.0 |
| $Li_2O$ | 0.0-3.0 |
| $Na_2O$ | 0.0-4.0 |
| $Nb_2O_5$ | 0.0-10.0 |
| $TiO_2$ | 0.0-7.5 |
| $WO_3$ | 0.0-10.0 |
| $Y_2O_3$ | 15.0-35.0 |
| $MgO + CaO + SrO + BaO$ | 0.0-7.5 |

In some exemplary embodiments, the glass composition includes the components set forth in Table 2.

TABLE 2

| Chemical | % by weight |
|---|---|
| $SiO_2$ | 30.0-33.0 |
| $Al_2O_3$ | 16.0-22.0 |

TABLE 2-continued

| Chemical | % by weight |
|---|---|
| $B_2O_3$ | 5.0-10.0 |
| $La_2O_3$ | 10.0-26.0 |
| $Nb_2O_5$ | 0.0-2.0 |
| $TiO_2$ | 0.0-1.5 |
| $Y_2O_3$ | 17.0-33.0 |

Further, it is to be appreciated that impurities or trace materials may be present in the glass composition without adversely affecting the glasses or the fibers. These impurities may enter the glass as raw material impurities or may be products formed by the chemical reaction of the molten glass with furnace components. Non-limiting examples of trace materials include $Fe_2O_3$, $Cr_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$, all of which are present in their oxide forms, and fluorine and chlorine.

The glass fibers produced from the inventive composition may have a refractive index between about 1.55 and about 1.69, an Abbe number less than about 65, and a coefficient of thermal expansion less than about $66 \times 10^{-7}$ cm/cm. In some exemplary embodiments, the glass fibers have a refractive index between about 1.55 and about 1.65, an Abbe number less than about 55, and a coefficient of thermal expansion less than about $52 \times 10^{-7}$ cm/cm. The difference between the forming temperature and the crystallization temperature is from about $-170°$ C. to about $77°$ C. Also, the viscosity as a function of temperature of the glass is such that glass fibers formed from the inventive composition may be formed in conventional platinum-lined melters (e.g., paramelters).

In the glass composition, $SiO_2$, $Y_2O_3$, and $B_2O_3$ provide a glass network for the fiber. The $SiO_2$ also plays a role in the chemical and thermal stability of the formed glass fiber. $La_2O$, $Nb_2O_5$, and $Y_2O_3$ are effective for increasing the refractive index of the glass fiber. $TiO_2$ is optionally added to adjust the refractive index and Abbe number. $Al_2O_3$ may be added to improve the chemical durability of the glass fiber. In some exemplary embodiments, the glass composition is free or substantially free of fluorine and lead, although either may be added at levels less than about 1% without adversely affecting the glass properties.

The fiberizing properties of the glass composition of the present invention include the fiberizing temperature, the liquidus temperature, and $\Delta T$. The fiberizing temperature is defined as the temperature that corresponds to a viscosity of about 1000 Poise. Lowering the fiberizing temperature may reduce the production cost of the glass fibers because it allows for a longer bushing life and reduced energy usage. For example, at a lower fiberizing temperature, a bushing operates at a cooler temperature and does not quickly "sag". Sag is a phenomenon that occurs in bushings that are held at an elevated temperature for extended periods of time. Thus, by lowering the fiberizing temperature, the sag rate of the bushing may be reduced and the bushing life can be increased. In the present invention, the glass composition has a fiberizing temperature (i.e., log 3 temperature) that is less than about $1443°$ C. In exemplary embodiments, the log 3 temperature is from about $1081°$ C. to about $1443°$ C.

The liquidus temperature is defined as the highest temperature at which equilibrium exists between liquid glass and its primary crystalline phase. At all temperatures above the liquidus temperature, the glass is free from crystals in its primary phase. At temperatures below the liquidus temperature, crystals may form. Additionally, the liquidus temperature is the greatest temperature at which devitrification can occur upon cooling the glass melt. At all temperatures above the liquidus temperature, the glass is completely molten. In exemplary embodiments, the liquidus temperature of the inventive composition may range from about 1169° C. to about 1531° C.

A third fiberizing property is "ΔT", which is defined as the difference between the fiberizing temperature (i.e., log 3 temperature) and the liquidus temperature. If the ΔT is too small, the molten glass may crystallize within the fiberizing apparatus and cause a break in the manufacturing process. Additionally, glasses with small or negative ΔT values may be formed utilizing methods that are not commonly employed when forming reinforcement fibers. For instance, discontinuous fibers may be generated by blowing gas or steam through a molten stream of glass. These discontinuous fibers require additional processing (such as carding or needle felting) to form them into suitable reinforcement fibers. Alternatively, continuous fibers can be formed from glasses having small or negative ΔT values by elevating the forming temperature well above the log 3 temperature. The temperature chosen needs to be above the liquidus temperature to prevent devitrification. The inventive composition may have a ΔT up to about 77° C., in exemplary embodiments, from about −170° C. to about 77° C.

In general, glass fibers according to the present invention may be formed by obtaining the raw materials or ingredients and mixing or blending the components in a conventional manner in the appropriate quantities to give the desired weight percentages of the final composition. For example, the components may be obtained from suitable ingredients or raw materials including, but not limited to, sand or pyrophyllite for $SiO_2$, kaolin, alumina or pyrophyllite for $Al_2O_3$, lithium carbonate or spodumene for $Li_2O$ and sodium feldspar, sodium carbonate or sodium sulfate for $Na_2O$, potassium feldspar or potassium carbonate for $K_2O$, Lanthanum oxide or Rare Earth Oxide blends for $La_2O_3$, rutile or ilmenite for $TiO_2$, and the remainder of the composition is supplied by refined oxides of $Nb_2O_5$, $WO_3$, or $Y_2O_3$. Glass cullet can also be used to supply one or more of the needed oxides.

The mixed batch is then melted in a platinum-lined melter, and the resulting molten glass is passed into bushings (e.g., platinum-alloy based bushings). The operating temperatures of the glass in the furnace and bushing are selected to appropriately adjust the viscosity of the glass, and may be maintained using suitable methods such as control devices. Preferably, the temperature at the front end or bottom of the melter is automatically controlled to reduce or eliminate devitrification. The molten glass is then pulled (drawn) through holes or orifices in the bottom or tip plate of the bushing to form glass fibers. The streams of molten glass flowing through the bushing orifices are attenuated to filaments by winding a strand formed of a plurality of individual filaments on a forming tube mounted on a rotatable collet of a winding machine or chopped at an adaptive speed.

The fibers may be further processed in a conventional manner suitable for the intended application. For instance, the continuous glass fibers may be sized with a sizing composition known to those of skill in the art. The sizing composition is in no way restricted, and may be any sizing composition suitable for application to glass fibers. The sized fibers may be used for reinforcing substrates, such as a variety of plastics, where the end product is desired to have a high refractive index. Such applications include, but are not limited to, the reinforcement of high refractive index plastics that have high strength and temperature resistance useful for laboratory equipment or a protective layer for flexible LCD screens. In this regard, the present invention also includes a composite material having a high refractive index that includes the inventive glass fibers, as described above, in combination with a hardenable matrix material. The matrix material may be any suitable thermoplastic or thermoset resin known to those of skill in the art, such as, but not limited to thermoplastics and thermoset resins such as polyesters, polypropylene, polyamide, polyethylene terephthalate, polybutylene, polysulfone, polyethersulfone, polyether imide, polyarylate, epoxy resins, unsaturated polyesters, phenolics, vinylesters, and elastomers. The polymer resins can be used alone or in combination to form the final composite product.

Having generally described this invention, a further understanding can be obtained by reference to certain specific examples illustrated below which are provided for purposes of illustration only and are not intended to be all inclusive or limiting unless otherwise specified.

EXAMPLES

Example 1

High Refractive Glass Compositions

Glass compositions according to the present invention were made by mixing reagent grade chemicals in proportioned amounts to achieve a final glass composition with the oxide weight percentages set forth in Tables 3-15. The raw materials were melted in a platinum crucible in an electrically heated furnace at a temperature of 1650° C. for 3 hours. The Abbe number was calculated from the refractive index of the glass measured at three wavelengths, 589.2 nm (d), 486.1 nm (F), and 656.3 nm (C). The Abbe number, V, was then calculated from the following equation:

$$V = \frac{n_d - 1}{n_F - n_c}$$

The coefficient of thermal expansion was measured by linear extension according to ASTM E228-06. The refractive index was measured using temperature controlled standardized immersion oils according to ASTM E1967-98. The forming viscosity (i.e., the temperature that corresponds to a viscosity of about 1000 Poise) was measured using a rotating cylinder method (ASTM C965). The liquidus temperature was measured by exposing glass to a temperature gradient in a platinum-alloy boat for 16 hours (ASTM C829). Density was measured by the Archimedes method (ASTM C693-93). The modulus was measured indirectly by measuring the speed of sound in a fiber with a known density.

TABLE 3

| Chemical | Ex. 1 (% by wt.) | Ex. 2 (% by wt.) | Ex. 3 (% by wt) | Ex. 4 (% by wt.) | Ex. 5 (% by wt.) | Ex. 6 (% by wt.) | Ex. 7 (% by wt.) |
|---|---|---|---|---|---|---|---|
| $Al_2O_3$ | 20.76 | 20.76 | 20.76 | 20.76 | 19.67 | 19.67 | 19.67 |
| $B_2O_3$ | 5.00 | 0.00 | 0.00 | 0.00 | 10.00 | 0.00 | 0.00 |

TABLE 3-continued

|  | Ex. 1 (% by wt.) | Ex. 2 (% by wt.) | Ex. 3 (% by wt) | Ex. 4 (% by wt.) | Ex. 5 (% by wt.) | Ex. 6 (% by wt.) | Ex. 7 (% by wt.) |
|---|---|---|---|---|---|---|---|
| MgO + CaO + SrO + BaO | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 0.00 | 5.00 | 0.00 | 0.00 | 0.00 | 10.00 | 0.00 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.00 | 0.00 | 0.00 | 5.00 | 0.00 | 0.00 | 0.00 |
| $SiO_2$ | 39.76 | 39.76 | 39.76 | 39.76 | 37.67 | 37.67 | 37.67 |
| $TiO_2$ | 0.00 | 0.00 | 0.00 | 0.00 | 0.00 | 0.00 | 0.00 |
| $WO_3$ | 0.00 | 0.00 | 5.00 | 0.00 | 0.00 | 0.00 | 10.00 |
| $Y_2O_3$ | 34.48 | 34.48 | 34.48 | 34.48 | 32.67 | 32.67 | 32.67 |
| Property |  |  |  |  |  |  |  |
| Abbe Number (FU) | 56.1 | 58.5 | 58 |  |  |  |  |
| Refractive Index (BA) | 1.6190 | 1.6475 | 1.6405 | 1.6503 | 1.6060 | 1.6596 | 1.6500 |
| CTE (cm × $10^{-7}$/cm) | 46 | 46.6 | 46.8 | 50.3 | 39.4 | 47 |  |
| Log 3 Temp (° C.) | 1268 | 1386 | 1302 |  | 1245 | 1385 |  |
| Liquidus Temp (° C.) | 1302 | 1418 | 1439 | 1458 | 1264 | 1413 |  |
| ΔT (° C.) | −34 | −32 | −137 |  |  | −28 |  |

TABLE 4

|  | Ex. 8 (% by wt.) | Ex. 9 (% by wt.) | Ex. 10 (% by wt) | Ex. 11 (% by wt.) | Ex. 12 (% by wt.) | Ex. 13 (% by wt.) | Ex. 14 (% by wt.) |
|---|---|---|---|---|---|---|---|
| Chemical |  |  |  |  |  |  |  |
| $Al_2O_3$ | 19.67 | 19.34 | 17.26 | 22.26 | 16.01 | 16.01 | 16.01 |
| $B_2O_3$ | 0.00 | 5.00 | 10.00 | 8.75 | 15.00 | 8.75 | 8.75 |
| MgO + CaO + SrO + BaO | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 0.00 | 6.50 | 11.00 | 9.75 | 9.75 | 16.00 | 9.75 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 10.00 | 0.00 | 0.00 | 0.00 | 0.00 | 0.00 | 0.00 |
| $SiO_2$ | 37.67 | 37.04 | 33.06 | 31.82 | 31.82 | 31.82 | 38.07 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 32.67 | 32.12 | 28.67 | 27.42 | 27.42 | 27.42 | 27.42 |
| Property |  |  |  |  |  |  |  |
| Abbe Number (FU) |  | 57.5 | 52.5 | 52.4 |  | 53.8 | 43.8 |
| Refractive Index (BA) | 1.6684 | 1.6340 | 1.6330 | 1.6346 | 1.6200 | 1.6516 | 1.6190 |
| CTE (cm × $10^{-7}$/cm) | 43.1 | 52 | 53.4 | 43.3 | 49 | 43.7 | 43.5 |
| Log 3 Temp (° C.) | 1443 | 1279 | 1190 | 1207 | 1161 | 1185 | 1255 |
| Liquidus Temp (° C.) | 1531 | 1303 | 1194 | 1311 | 1199 | 1257 | 1233 |
| ΔT (° C.) | −88 | −24 | −4 | −103 | −38 | −72 | 22 |

TABLE 5

| | Ex. 15 (% by wt.) | Ex. 16 (% by wt.) | Ex. 17 (% by wt) | Ex. 18 (% by wt.) | Ex. 19 (% by wt.) | Ex. 20 (% by wt.) | Ex. 21 (% by wt.) |
|---|---|---|---|---|---|---|---|
| Chemical | | | | | | | |
| $Al_2O_3$ | 16.01 | 16.76 | 16.76 | 16.76 | 16.26 | 16.26 | 16.26 |
| $B_2O_3$ | 8.75 | 9.50 | 9.50 | 9.50 | 9.00 | 9.00 | 9.00 |
| MgO + CaO + SrO + BaO | 0.00 | 2.50 | 0.00 | 0.00 | 5.00 | 0.00 | 0.00 |
| $K_2O$ | 0.00 | 0.00 | 0.00 | 0.00 | 0.00 | 0.00 | 0.00 |
| $La_2O_3$ | 9.75 | 10.50 | 10.50 | 10.50 | 10.00 | 10.00 | 10.00 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.00 | 0.00 | 0.00 | 2.50 | 0.00 | 0.00 | 5.00 |
| $SiO_2$ | 31.82 | 32.57 | 32.57 | 32.57 | 32.07 | 32.07 | 32.07 |
| $TiO_2$ | 0.00 | 0.00 | 2.50 | 0.00 | 0.00 | 5.00 | 0.00 |
| $WO_3$ | 0.00 | 0.00 | 0.00 | 0.00 | 0.00 | 0.00 | 0.00 |
| $Y_2O_3$ | 33.67 | 28.17 | 28.17 | 28.17 | 27.67 | 27.67 | 27.67 |
| Property | | | | | | | |
| Abbe Number (FU) | 49.7 | 48.5 | 53.6 | 63.8 | 57.6 | 46.9 | 49.9 |
| Refractive Index (BA) | 1.6516 | 1.6347 | 1.6480 | 1.6440 | 1.6399 | 1.6620 | 1.6530 |
| CTE (cm × $10^{-7}$/cm) | 43.8 | 42.5 | 49.7 | 50.4 | 50.5 | 46.8 | 44.5 |
| Log 3 Temp (° C.) | 1184 | 1191 | 1179 | 1184 | 1193 | 1174 | 1209 |
| Liquidus Temp (° C.) | 1284 | 1256 | 1223 | 1225 | 1265 | 1252 | 1371 |
| ΔT (° C.) | −100 | −64 | −44 | −41 | −72 | −77 | −162 |

TABLE 6

| | Ex. 22 (% by wt.) | Ex. 23 (% by wt.) | Ex. 24 (% by wt) | Ex. 25 (% by wt.) | Ex. 26 (% by wt.) | Ex. 27 (% by wt.) | Ex. 28 (% by wt.) |
|---|---|---|---|---|---|---|---|
| Chemical | | | | | | | |
| $Al_2O_3$ | 15.76 | 15.76 | 15.76 | 16.26 | 16.26 | 16.26 | 15.76 |
| $B_2O_3$ | 8.50 | 8.50 | 8.50 | 9.00 | 9.00 | 9.00 | 8.50 |
| MgO + CaO + SrO + BaO | 7.50 | 0.00 | 0.00 | 2.50 | 2.50 | 0.00 | 2.50 |
| $K_2O$ | 0.00 | 0.00 | 0.00 | 0.00 | 0.00 | 0.00 | 0.00 |
| $La_2O_3$ | 9.50 | 9.50 | 9.50 | 10.00 | 10.00 | 10.00 | 9.50 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.00 | 0.00 | 7.50 | 0.00 | 2.50 | 2.50 | 2.50 |
| $SiO_2$ | 31.57 | 31.57 | 31.57 | 32.07 | 32.07 | 32.07 | 31.57 |
| $TiO_2$ | 0.00 | 7.50 | 0.00 | 2.50 | 0.00 | 2.50 | 2.50 |
| $WO_3$ | 0.00 | 0.00 | 0.00 | 0.00 | 0.00 | 0.00 | 0.00 |
| $Y_2O_3$ | 27.17 | 27.17 | 27.17 | 27.67 | 27.67 | 27.67 | 27.17 |
| Property | | | | | | | |
| Abbe Number (FU) | 53 | | | 46 | 49.3 | | |
| Refractive Index (BA) | 1.6402 | 1.6750 | 1.6620 | 1.6507 | 1.6454 | | |
| CTE (cm × $10^{-7}$/cm) | 53.1 | 49 | 40.2 | 48.3 | 50.9 | 47.2 | 45.7 |
| Log 3 Temp (° C.) | 1189 | 1164 | | 1179 | 1186 | 1173 | 1172 |
| Liquidus Temp (° C.) | 1299 | 1222 | 1397 | 1213 | 1216 | 1232 | 1208 |
| ΔT (° C.) | −110 | −58 | | −34 | −31 | −59 | −37 |

TABLE 7

| | Ex. 29 (% by wt.) | Ex. 30 (% by wt.) | Ex. 31 (% by wt) | Ex. 32 (% by wt.) | Ex. 33 (% by wt.) | Ex. 34 (% by wt.) | Ex. 35 (% by wt.) |
|---|---|---|---|---|---|---|---|
| Chemical | | | | | | | |
| $Al_2O_3$ | 17.00 | 16.74 | 16.91 | 16.57 | 16.83 | 16.40 | 21.00 |
| $B_2O_3$ | 9.85 | 9.70 | 9.80 | 9.60 | 9.75 | 9.50 | 5.07 |
| MgO + CaO + SrO + BaO | 0.00 | 0.00 | 0.00 | 0.00 | 0.00 | 0.00 | 0.00 |
| $K_2O$ | 0.00 | 0.00 | 0.00 | 0.00 | 2.50 | 5.00 | 0.00 |
| $La_2O_3$ | 10.83 | 10.67 | 10.78 | 10.56 | 10.73 | 10.45 | 28.93 |
| $Li_2O$ | 1.50 | 3.00 | 0.00 | 0.00 | 0.00 | 0.00 | 0.00 |
| $Na_2O$ | 0.00 | 0.00 | 2.00 | 4.00 | 0.00 | 0.00 | 0.00 |
| $Nb_2O_5$ | 0.00 | 0.00 | 0.00 | 0.00 | 0.00 | 0.00 | 0.00 |
| $SiO_2$ | 32.58 | 32.08 | 32.41 | 31.75 | 32.24 | 31.41 | 30.00 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 28.24 | 27.81 | 28.10 | 27.52 | 27.95 | 27.24 | 15.00 |
| Property | | | | | | | |
| Abbe Number (FU) | | | | | | | |
| Refractive Index (BA) | | | | | | | |
| CTE (cm × $10^{-7}$/cm) | 53.7 | 66.1 | 54.1 | 66.1 | 56.9 | 65.8 | 51.7 |
| Log 3 Temp (° C.) | 1130 | 1081 | 1176 | 1164 | 1189 | 1184 | 1206 |
| Liquidus Temp (° C.) | 1228 | 1251 | 1273 | 1300 | 1251 | 1288 | 1226 |
| ΔT (° C.) | −98 | −170 | −97 | −136 | −61 | −103 | −20 |

TABLE 8

| | Ex. 36 (% by wt.) | Ex. 37 (% by wt.) | Ex. 38 (% by wt) | Ex. 39 (% by wt.) | Ex. 40 (% by wt.) | Ex. 41 (% by wt.) | Ex. 42 (% by wt.) |
|---|---|---|---|---|---|---|---|
| Chemical | | | | | | | |
| $Al_2O_3$ | 16.95 | 16.64 | 16.32 | 20.07 | 19.13 | 18.20 | 19.00 |
| $B_2O_3$ | 9.69 | 9.38 | 9.06 | 6.30 | 7.54 | 8.77 | 6.00 |
| MgO + CaO + SrO + BaO | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 10.69 | 10.38 | 10.06 | 24.45 | 19.96 | 15.48 | 23.00 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 |
| $SiO_2$ | 32.76 | 32.45 | 32.13 | 30.77 | 31.53 | 32.30 | 32.00 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 29.92 | 31.17 | 32.42 | 18.42 | 21.84 | 25.26 | 20.00 |
| Property | | | | | | | |
| Abbe Number (FU) | | | | | | | |
| Refractive Index (BA) | | | | | | | 1.6535 |
| CTE (cm × $10^{-7}$/cm) | 50.8 | 49.4 | 49.7 | 51.4 | 49.3 | 48.2 | |
| Log 3 Temp (° C.) | 1199 | 1178 | 1179 | 1201 | 1184 | 1196 | 1200 |
| Liquidus Temp (° C.) | 1213 | 1258 | 1218 | 1204 | 1199 | 1169 | 1246 |
| ΔT (° C.) | −14 | −80 | −39 | −3 | −16 | 27 | −46 |

TABLE 9

|  | Ex. 43 (% by wt.) | Ex. 44 (% by wt.) | Ex. 45 (% by wt) | Ex. 46 (% by wt.) | Ex. 47 (% by wt.) | Ex. 48 (% by wt.) | Ex. 49 (% by wt.) |
|---|---|---|---|---|---|---|---|
| Chemical | | | | | | | |
| $Al_2O_3$ | 19.37 | 19.00 | 19.49 | 19.00 | 19.39 | 19.00 | 19.41 |
| $B_2O_3$ | 6.36 | 6.00 | 6.36 | 6.00 | 6.14 | 7.00 | 6.99 |
| $MgO + CaO + SrO + BaO$ | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 23.26 | 24.00 | 23.71 | 26.00 | 25.31 | 23.00 | 23.30 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.17 | 1.50 | 1.07 | 0.00 | 0.11 | 0.00 | 0.24 |
| $SiO_2$ | 31.54 | 32.00 | 31.71 | 32.00 | 31.69 | 31.50 | 31.36 |
| $TiO_2$ | 0.11 | 0.00 | 0.19 | 0.00 | 0.16 | 1.50 | 1.04 |
| $WO_3$ | 0.00 | 0.00 | 0.00 | 0.00 | 0.00 | 0.00 | 0.00 |
| $Y_2O_3$ | 19.19 | 17.50 | 17.47 | 17.00 | 17.20 | 18.00 | 17.65 |
| Property | | | | | | | |
| Abbe Number (FU) | | | | | | | 54.08 |
| Refractive Index (BA) | 1.6529 | 1.6533 | 1.6533 | 1.6523 | 1.652 | 1.657 | 1.6553 |
| CTE (cm × $10^{-7}$/cm) | | | | | | | 44.0 |
| Log 3 Temp (° C.) | 1189 | 1201 | 1195 | 1201 | 1202 | 1184 | 1190 |
| Liquidus Temp (° C.) | 1209 | 1210 | 1229 | 1201 | 1212 | 1205 | 1174 |
| ΔT (° C.) | −20 | −9 | −34 | 0 | −10 | −21 | 16 |

TABLE 10

|  | Ex. 50 (% by wt.) | Ex. 51 (% by wt.) | Ex. 52 (% by wt) | Ex. 53 (% by wt.) | Ex. 54 (% by wt.) | Ex. 55 (% by wt.) | Ex. 56 (% by wt.) |
|---|---|---|---|---|---|---|---|
| Chemical | | | | | | | |
| $Al_2O_3$ | 19.00 | 19.42 | 19.00 | 19.37 | 19.00 | 19.38 | 20.50 |
| $B_2O_3$ | 7.50 | 7.40 | 8.00 | 7.65 | 8.00 | 7.62 | 8.00 |
| $MgO + CaO + SrO + BaO$ | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 25.00 | 24.61 | 23.00 | 23.21 | 23.00 | 23.33 | 23.00 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.00 | 0.27 | 0.00 | 0.15 | 1.50 | 1.21 | 0.00 |
| $SiO_2$ | 30.50 | 30.48 | 30.00 | 30.21 | 30.50 | 30.49 | 30.00 |
| $TiO_2$ | 0.00 | 0.23 | 0.00 | 0.18 | 0.00 | 0.24 | 1.50 |
| $WO_3$ | 0.00 | 0.00 | 0.00 | 0.00 | 0.00 | 0.00 | 0.00 |
| $Y_2O_3$ | 18.00 | 17.61 | 20.00 | 19.23 | 18.00 | 17.73 | 17.00 |
| Property | | | | | | | |
| Abbe Number (FU) | | | | | | | |
| Refractive Index (BA) | 1.6517 | 1.6534 | 1.6531 | 1.6532 | 1.6527 | 1.6515 | 1.6529 |
| CTE (cm × $10^{-7}$/cm) | | | | | | | |
| Log 3 Temp (° C.) | 1190 | 1186 | 1179 | 1181 | 1183 | 1178 | 1180 |
| Liquidus Temp (° C.) | 1207 | 1203 | 1178 | 1212 | 1216 | 1184 | 1276 |
| ΔT (° C.) | −17 | −17 | 1 | −31 | −33 | −7 | −96 |

TABLE 11

|  | Ex. 57 (% by wt.) | Ex. 58 (% by wt.) | Ex. 59 (% by wt) | Ex. 60 (% by wt.) | Ex. 61 (% by wt.) | Ex. 62 (% by wt.) | Ex. 63 (% by wt.) |
|---|---|---|---|---|---|---|---|
| Chemical | | | | | | | |
| $Al_2O_3$ | 20.32 | 21.00 | 21.09 | 21.00 | 20.98 | 21.00 | 20.85 |
| $B_2O_3$ | 7.56 | 5.00 | 5.48 | 6.00 | 6.15 | 7.00 | 6.91 |
| MgO + CaO + SrO + BaO | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 23.35 | 23.00 | 23.23 | 24.50 | 24.04 | 23.00 | 23.20 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.24 | 0.50 | 0.43 | 0.00 | 0.24 | 2.00 | 1.28 |
| $SiO_2$ | 30.27 | 32.00 | 31.73 | 31.00 | 31.05 | 30.00 | 30.42 |
| $TiO_2$ | 0.99 | 0.00 | 0.19 | 0.50 | 0.31 | 0.00 | 0.12 |
| $WO_3$ | 0.00 | 0.00 | 0.00 | 0.00 | 0.00 | 0.00 | 0.00 |
| $Y_2O_3$ | 17.27 | 18.50 | 17.85 | 17.00 | 17.24 | 17.00 | 17.20 |
| Property | | | | | | | |
| Abbe Number (FU) | | | | | | | |
| Refractive Index (BA) | 1.6556 | 1.6541 | 1.6528 | 1.6525 | 1.6506 | 1.6551 | 1.6535 |
| CTE (cm × $10^{-7}$/cm) | | | | | | | |
| Log 3 Temp (° C.) | 1187 | 1215 | 1212 | 1200 | 1204 | 1182 | 1199 |
| Liquidus Temp (° C.) | 1252 | 1291 | 1280 | 1272 | 1268 | 1277 | 1272 |
| ΔT (° C.) | −65 | −76 | −68 | −71 | −64 | −95 | −73 |

TABLE 12

|  | Ex. 64 (% by wt.) | Ex. 65 (% by wt.) | Ex. 66 (% by wt) | Ex. 67 (% by wt.) | Ex. 68 (% by wt.) | Ex. 69 (% by wt.) | Ex. 70 (% by wt.) |
|---|---|---|---|---|---|---|---|
| Chemical | | | | | | | |
| $Al_2O_3$ | 21.50 | 21.06 | 20.64 | 20.08 | 18.46 | 17.46 | 16.46 |
| $B_2O_3$ | 6.50 | 6.67 | 6.74 | 6.72 | 6.99 | 6.99 | 6.99 |
| MgO + CaO + SrO + BaO | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 23.00 | 23.23 | 23.32 | 23.69 | 23.30 | 23.30 | 23.30 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.00 | 0.16 | 0.63 | 0.51 | 0.24 | 0.24 | 0.24 |
| $SiO_2$ | 30.00 | 30.38 | 30.65 | 30.99 | 31.36 | 31.36 | 31.36 |
| $TiO_2$ | 0.00 | 0.15 | 0.33 | 0.36 | 2.00 | 3.00 | 4.00 |
| $WO_3$ | 0.00 | 0.00 | 0.00 | 0.00 | 0.00 | 0.00 | 0.00 |
| $Y_2O_3$ | 19.00 | 18.35 | 17.68 | 17.65 | 17.65 | 17.65 | 17.65 |
| Property | | | | | | | |
| Abbe Number (FU) | | | | | | | |
| Refractive Index (BA) | 1.6532 | 1.6520 | 1.6526 | 1.6531 | 1.6562 | 1.662 | 1.6697 |
| CTE (cm × $10^{-7}$/cm) | | | | | | | |
| Log 3 Temp (° C.) | 1194 | 1200 | 1188 | 1189 | 1181 | 1172 | 1163 |
| Liquidus Temp (° C.) | 1283 | 1261 | 1256 | 1245 | 1188 | 1141 | 1133 |
| ΔT (° C.) | −89 | −61 | −68 | −56 | −7 | 31 | 30 |

TABLE 13

|  | Ex. 71 (% by wt.) | Ex. 72 (% by wt.) | Ex. 73 (% by wt.) | Ex. 74 (% by wt.) | Ex. 75 (% by wt.) | Ex. 76 (% by wt.) | Ex. 77 (% by wt.) |
|---|---|---|---|---|---|---|---|
| Chemical | | | | | | | |
| $Al_2O_3$ | 15.46 | 19.41 | 19.41 | 19.41 | 19.41 | 19.41 | 19.41 |
| $B_2O_3$ | 6.99 | 6.03 | 5.03 | 4.03 | 3.03 | 6.99 | 6.99 |
| MgO + CaO + SrO + BaO | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 23.30 | 23.30 | 23.30 | 23.30 | 23.30 | 23.30 | 23.30 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.24 | 0.24 | 0.24 | 0.24 | 0.24 | 0.24 | 0.24 |
| $SiO_2$ | 31.36 | 31.36 | 31.36 | 31.36 | 31.36 | 30.40 | 29.40 |
| $TiO_2$ | 5.00 | 2.00 | 3.00 | 4.00 | 5.00 | 2.00 | 3.00 |
| $WO_3$ | 0.00 | 0.00 | 0.00 | 0.00 | 0.00 | 0.00 | 0.00 |
| $Y_2O_3$ | 17.65 | 17.65 | 17.65 | 17.65 | 17.65 | 17.65 | 17.65 |
| Property | | | | | | | |
| Abbe Number (FU) | | | | | | | |
| Refractive Index (BA) | 1.6754 | 1.6597 | 1.668 | 1.6774 | 1.6857 | 1.6605 | 1.6688 |
| CTE (cm × $10^{-7}$/cm) | | | | | | | |
| Log 3 Temp (° C.) | 1152 | 1179 | 1180 | 1183 | 1183 | 1164 | 1158 |
| Liquidus Temp (° C.) | 1181 | 1234 | 1249 | 1261 | 1272 | 1217 | 1231 |
| ΔT (° C.) | −29 | −56 | −69 | −78 | −88 | −53 | −72 |

TABLE 14

|  | Ex. 78 (% by wt.) | Ex. 79 (% by wt.) | Ex. 80 (% by wt.) | Ex. 81 (% by wt.) | Ex. 82 (% by wt.) | Ex. 83 (% by wt.) | Ex. 84 (% by wt.) |
|---|---|---|---|---|---|---|---|
| Chemical | | | | | | | |
| $Al_2O_3$ | 19.41 | 19.41 | 19.25 | 18.76 | 18.26 | 17.77 | 17.52 |
| $B_2O_3$ | 6.99 | 6.99 | 6.92 | 6.92 | 6.92 | 6.92 | 7.20 |
| MgO + CaO + SrO + BaO | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $La_2O_3$ | 23.30 | 23.30 | 23.06 | 23.06 | 23.06 | 23.06 | 23.28 |
| $Li_2O$ | 0.00 | 0.00 | 0.00 | 0.00 | 0.00 | 0.00 | 0.00 |
| $Na_2O$ | 0.00 | 0.00 | 0.00 | 0.00 | 0.00 | 0.00 | 0.00 |
| $Nb_2O_5$ | 0.24 | 0.24 | 0.24 | 0.24 | 0.24 | 0.24 | 0.00 |
| $SiO_2$ | 28.40 | 27.40 | 31.08 | 30.58 | 30.09 | 29.59 | 31.58 |
| $TiO_2$ | 4.00 | 5.00 | 1.98 | 2.97 | 3.96 | 4.95 | 2.82 |
| $WO_3$ | 0.00 | 0.00 | 0.00 | 0.00 | 0.00 | 0.00 | 0.00 |
| $Y_2O_3$ | 17.65 | 17.65 | 17.47 | 17.47 | 17.47 | 17.47 | 17.61 |
| Property | | | | | | | |
| Abbe Number (FU) | | | | | | | |
| Refractive Index (BA) | 1.677 | 1.686 | 1.6566 | 1.6634 | 1.6718 | 1.6792 | 1.6560 |
| CTE (cm × $10^{-7}$/cm) | | | | | | | |
| Log 3 Temp (° C.) | 1142 | 1135 | 1166 | 1164 | 1157 | 1146 | 1181 |
| Liquidus Temp (° C.) | 1234 | 1249 | 1217 | 1209 | 1187 | 1179 | 1104 |
| ΔT (° C.) | −92 | −113 | −51 | −45 | −29 | −33 | 77 |

TABLE 15

|  | Ex. 85 (% by wt.) | Ex. 86 (% by wt.) |
|---|---|---|
| Chemical |  |  |
| $Al_2O_3$ | 17.23 | 17.42 |
| $B_2O_3$ | 7.26 | 6.86 |
| MgO + CaO + SrO + BaO | 0.00 | 0.00 |
| $K_2O$ | 0.00 | 0.00 |
| $La_2O_3$ | 23.34 | 23.42 |
| $Li_2O$ | 0.00 | 0.00 |
| $Na_2O$ | 0.00 | 0.00 |
| $Nb_2O_5$ | 0.00 | 0.00 |
| $SiO_2$ | 31.69 | 31.25 |
| $TiO_2$ | 2.84 | 3.27 |
| $WO_3$ | 0.00 | 0.00 |
| $Y_2O_3$ | 17.65 | 17.78 |
| Property |  |  |
| Abbe Number (FU) |  |  |
| Refractive Index (BA) | 1.6597 | 1.6633 |
| CTE (cm × $10^{-7}$/cm) |  |  |
| Log 3 Temp (° C.) | 1178 | 1172 |
| Liquidus Temp (° C.) | 1163 | 1148 |
| ΔT (° C.) | 15 | 24 |

Looking at Tables 3-15, it can be concluded that the glass compositions of Examples 1-86 have a very high refractive index in comparison with commercially available continuous fiber products (e.g., the refractive index for S2 glass is 1.52, E-glass is about 1.58 to 1.62 and ECR glass is 1.58) with forming temperatures and ΔT values that allow these glasses to be manufactured by known platinum-lined furnace melting techniques.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A composition for preparing glass fibers having a refractive index between about 1.55 and about 1.69, the composition comprising:
   $SiO_2$ in an amount from 30.0 to 40.0% by weight;
   $Al_2O_3$ in an amount from 15.0 to 23.0% by weight;
   $Y_2O_3$ in an amount from 15.0 to 35.0% by weight;
   $B_2O_3$ in an amount from 5.0 to 15.0% by weight;
   $K_2O$ in an amount from 0.0 to 5.0% by weight;
   $La_2O_3$ in an amount from 0.0 to 30.0% by weight;
   $Li_2O$ in an amount from 0.0 to 3.0% by weight;
   $Na_2O$ in an amount from 0.0 to 4.0% by weight;
   $Nb_2O_5$ in an amount from 0.0 to 10.0% by weight;
   $TiO_2$ in an amount from 0.0 to 7.5% by weight;
   $WO_3$ in an amount from 0.0 to 10.0% by weight; and
   RO in an amount from 0.0 to 7.5% by weight, wherein RO is one or more of MgO, CaO, SrO, and BaO.

2. The composition of claim 1, wherein said composition has a ΔT up to about 77° C.

3. The composition of claim 1, wherein said composition has a ΔT from about −170° C. to about 77° C.

4. The composition of claim 1, wherein said composition has a log 3 temperature that is less than about 1443° C.

5. The composition of claim 1, wherein said composition has a liquidus temperature greater than about 1531° C.

6. The composition of claim 1, wherein said composition is substantially free of fluorine and lead.

7. The composition of claim 1, wherein said composition comprises:
   $SiO_2$ in an amount from 30.0 to 33.0% by weight;
   $Al_2O_3$ in an amount from 16.0 to 22.0% by weight;
   $Y_2O_3$ in an amount from 17.0 to 33% by weight;
   $B_2O_3$ in an amount from 5.0 to 10.0% by weight;
   $La_2O_3$ in an amount from 10.0 to 26.0% by weight;
   $Nb_2O_5$ in an amount from 0.0 to 2.0% by weight; and
   $TiO_2$ in an amount from 0.0 to 1.5% by weight.

8. A continuous glass fiber comprising:
   a glass composition comprising:
   $SiO_2$ in an amount from 30.0 to 40.0% by weight;
   $Al_2O_3$ in an amount from 15.0 to 23.0% by weight;
   $Y_2O_3$ in an amount from 15.0 to 35.0% by weight;
   $B_2O_3$ in an amount from 0.0 to 15.0% by weight;
   $K_2O$ in an amount from 0.0 to 5.0% by weight;
   $La_2O_3$ in an amount from 0.0 to 30.0% by weight;
   $Li_2O$ in an amount from 0.0 to 3.0% by weight;
   $Na_2O$ in an amount from 0.0 to 4.0% by weight;
   $Nb_2O_5$ in an amount from 0.0 to 10.0% by weight;
   $TiO_2$ in an amount from 0.0 to 7.5% by weight;
   $WO_3$ in an amount from 0.0 to 10.0% by weight; and
   RO in an amount from 0.0 to 5.0% by weight, wherein RO is one or more of MgO, CaO, SrO, and BaO, wherein said glass fiber has a refractive index between about 1.55 and about 1.69.

9. The glass fiber of claim 8, wherein said composition is substantially free of fluorine and lead.

10. The glass fiber of claim 8, wherein said glass fiber has an Abbe number less than about 65 and a coefficient of thermal expansion less than about 66×$10^{-7}$ cm/cm.

11. A reinforced composite product comprising:
    a polymer matrix; and
    a plurality of glass fibers, said glass fibers being produced from a composition comprising:
    $SiO_2$ in an amount from 30.0 to 40.0% by weight;
    $Al_2O_3$ in an amount from 15.0 to 23.0% by weight;
    $Y_2O_3$ in an amount from 15.0 to 35.0% by weight;
    $B_2O_3$ in an amount from 5.0 to 15.0% by weight;
    $K_2O$ in an amount from 0.0 to 5.0% by weight;
    $La_2O_3$ in an amount from 0.0 to 30.0% by weight;
    $Li_2O$ in an amount from 0.0 to 3.0% by weight;
    $Na_2O$ in an amount from 0.0 to 4.0% by weight;
    $Nb_2O_5$ in an amount from 0.0 to 10.0% by weight;
    $TiO_2$ in an amount from 0.0 to 7.5% by weight;
    $WO_3$ in an amount from 0.0 to 10.0% by weight; and
    RO in an amount from 0.0 to 7.5% by weight, wherein RO is one or more of MgO, CaO, SrO, and BaO.

12. The composite product of claim 11, wherein said glass fibers have an Abbe number less than about 65.

13. The composite product of claim 12, wherein said glass fibers have a coefficient of thermal expansion less than about 66×$10^{-7}$ cm/cm.

14. The composite product of claim 12, wherein said refractive index is between about 1.55 and about 1.65 and said Abbe number is less than about 60.

15. A reinforced composite product comprising:
    a polymer matrix; and
    a plurality of glass fibers, said glass fibers being produced from a composition comprising:
    $SiO_2$ in an amount from 30.0 to 33.0% by weight;

$Al_2O_3$ in an amount from 16.0 to 22.0% by weight;
$Y_2O_3$ in an amount from 17.0 to 33% by weight;
$B_2O_3$ in an amount from 5.0 to 10.0% by weight;
$K_2O$ in an amount from 0.0 to 5.0% by weight;
$La_2O_3$ in an amount from 10.0 to 26.0% by weight;
$Li_2O$ in an amount from 0.0 to 3.0% by weight;
$Na_2O$ in an amount from 0.0 to 4.0% by weight;
$Nb_2O_5$ in an amount from 0.0 to 2.0% by weight;
$TiO_2$ in an amount from 0.0 to 1.5% by weight;
$WO3$ in an amount from 0.0 to 10.0% by weight; and
RO in an amount from 0.0 to 7.5% by weight, wherein RO is one or more of MgO, CaO, SrO, and BaO.

16. The composite product of claim 11, wherein said composition is substantially free of fluorine and lead.

17. The composite product of claim 11, wherein said polymer matrix is polymer selected from the group consisting of polyesters, polypropylene, polyamide, polyethylene terephtalate, polybutylene, epoxy resins, unsaturated polyesters, phenolics, vinylesters and combinations thereof.

18. A method of forming glass fibers comprising:
providing a molten glass composition including:
$SiO_2$ in an amount from 30.0 to 40.0% by weight;
$Al_2O_3$ in an amount from 15.0 to 23.0% by weight;
$Y_2O_3$ in an amount from 15.0 to 35.0% by weight;
$B_2O_3$ in an amount from 0.0 to 15.0% by weight;
$K_2O$ in an amount from 0.0 to 5.0% by weight;
$La_2O_3$ in an amount from 0.0 to 30.0% by weight;
$Li_2O$ in an amount from 0.0 to 3.0% by weight;
$Na_2O$ in an amount from 0.0 to 4.0% by weight;
$Nb_2O_5$ in an amount from 0.0 to 10.0% by weight;
$TiO_2$ in an amount from 0.0 to 7.5% by weight;
$WO_3$ in an amount from 0.0 to 10.0% by weight; and
RO in an amount from 0.0 to 5.0% by weight, wherein RO is one or more of MgO, CaO, SrO, and BaO; and
drawing said molten glass composition through orifices in a bushing to form a glass fiber, wherein said glass fiber has a refractive index between about 1.55 and about 1.69.

19. The method of claim 18, wherein said glass fiber has an Abbe number less than about 65.

20. The method of claim 19, wherein said composition is substantially free of fluorine and lead.

21. The method of claim 20, wherein said glass fiber has a coefficient of thermal expansion less than about $66 \times 10^{-7}$ cm/cm.

* * * * *